United States Patent [19]

Sakamoto

[11] Patent Number: 4,617,660
[45] Date of Patent: Oct. 14, 1986

[54] FAULTY-MEMORY PROCESSING METHOD AND APPARATUS

[75] Inventor: Yasuhiko Sakamoto, Fujisawa, Japan

[73] Assignee: Fujitsu Limited, Kawasaki, Japan

[21] Appl. No.: 587,518

[22] Filed: Mar. 8, 1984

[30] Foreign Application Priority Data

Mar. 10, 1983 [JP] Japan .................................. 58-039674

[51] Int. Cl.⁴ ........................ G06F 11/10; G11C 29/00
[52] U.S. Cl. ............................................. 371/13; 371/38
[58] Field of Search ............................ 371/13, 38, 10

[56] References Cited

U.S. PATENT DOCUMENTS

| | | | |
|---|---|---|---|
| 4,255,808 | 3/1981 | Schaber | 371/38 |
| 4,360,915 | 11/1982 | Sindelar | 371/13 |
| 4,371,930 | 2/1983 | Kim | 371/13 |
| 4,380,812 | 4/1983 | Ziegler, II et al. | 371/38 |
| 4,394,763 | 7/1983 | Nagano et al. | 371/38 |
| 4,456,993 | 6/1984 | Taniguchi et al. | 371/13 |
| 4,506,362 | 3/1985 | Morley | 371/13 |
| 4,535,455 | 8/1985 | Peterson | 371/13 |

*Primary Examiner*—Charles E. Atkinson
*Attorney, Agent, or Firm*—Staas & Halsey

[57] ABSTRACT

A faulty-memory processing method and apparatus in a data processing system which executes a time-sharing data process with breaks. Hard error which may exist in a cell in a normal memory is detected by using an error correction circuit. After correcting an error in information read out from a detected hard-error cell in the normal memory, information including the above corrected information with respect to the detected hard-error cell is transcribed into a relief memory. The above correction and transcription is executed during the breaks in the time-sharing data process.

15 Claims, 10 Drawing Figures

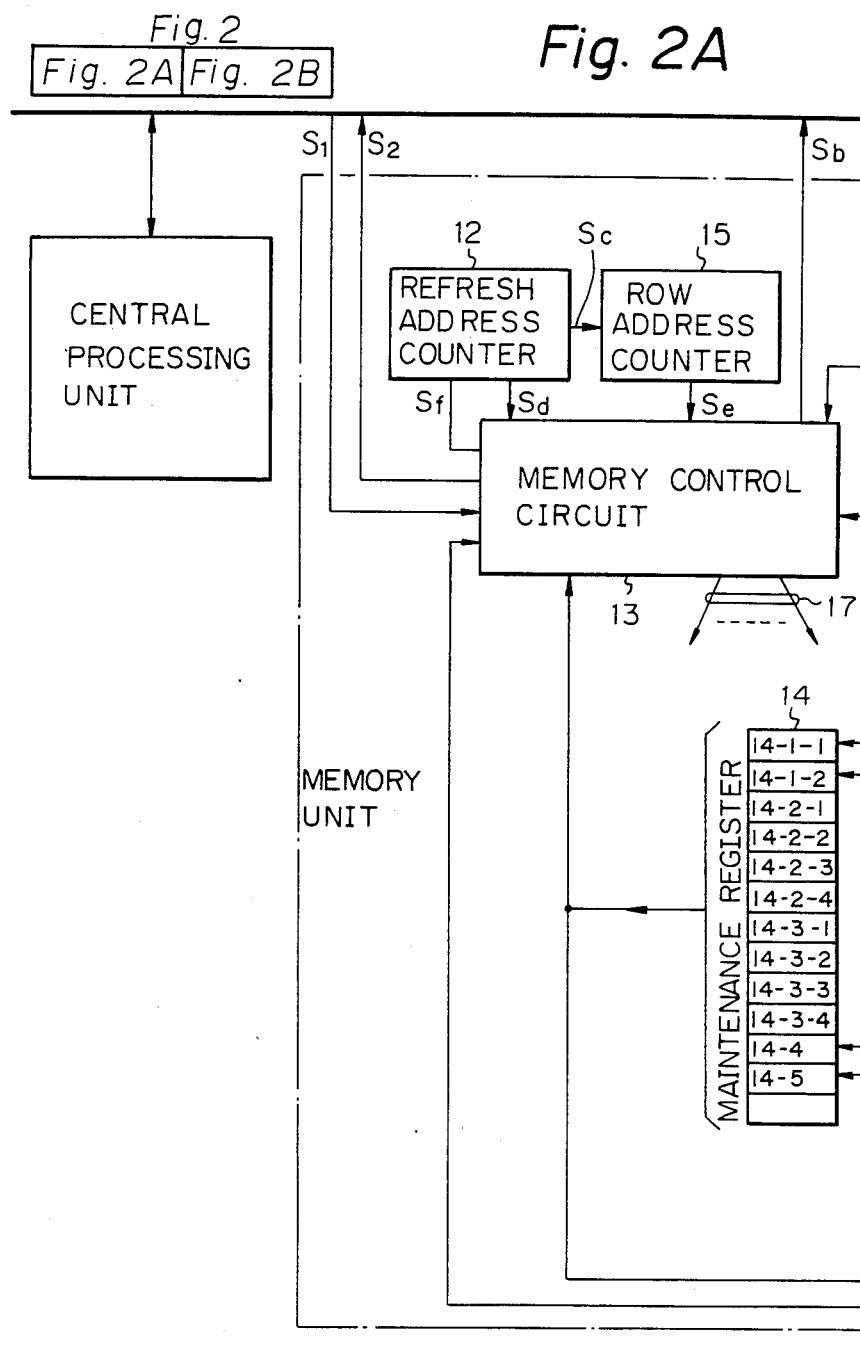

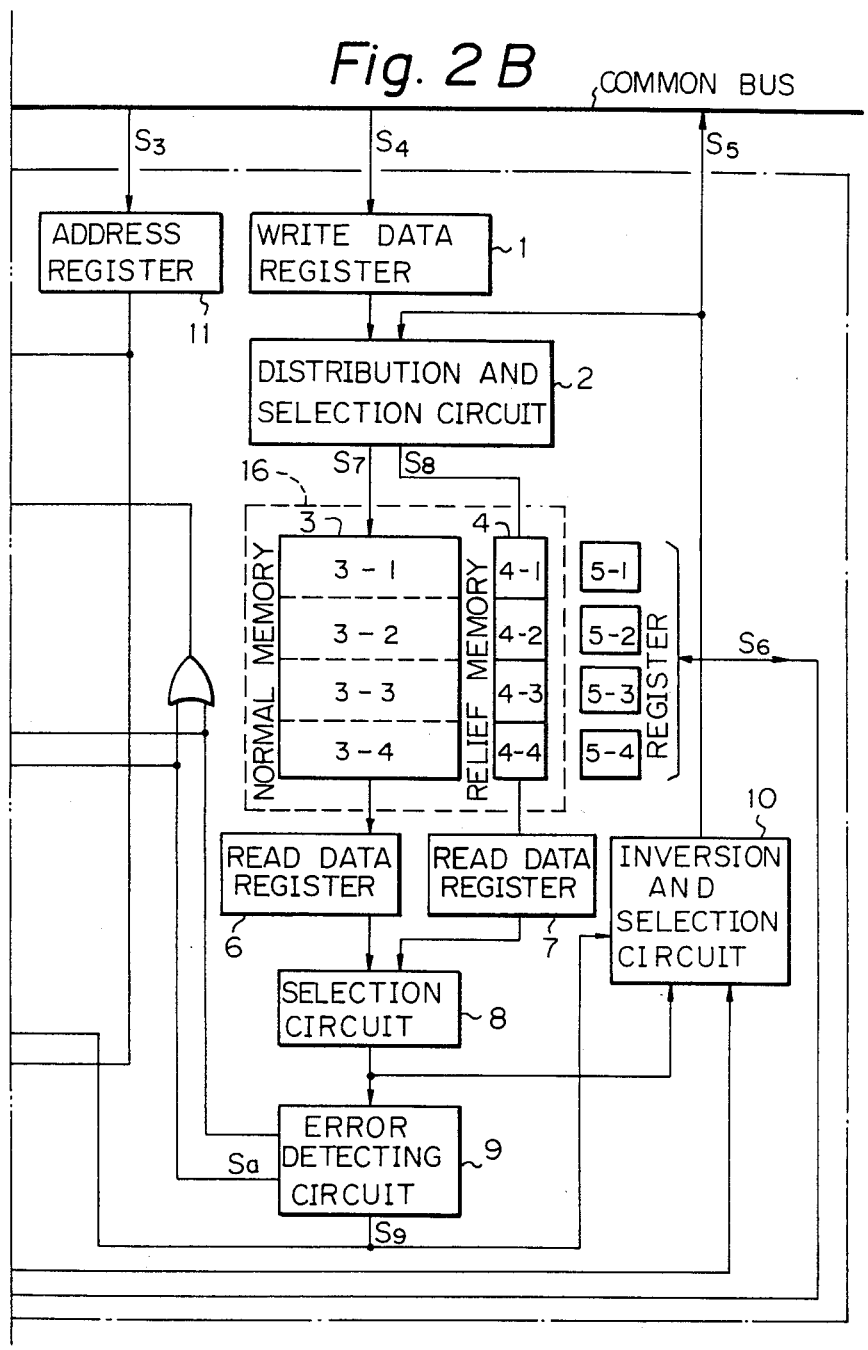

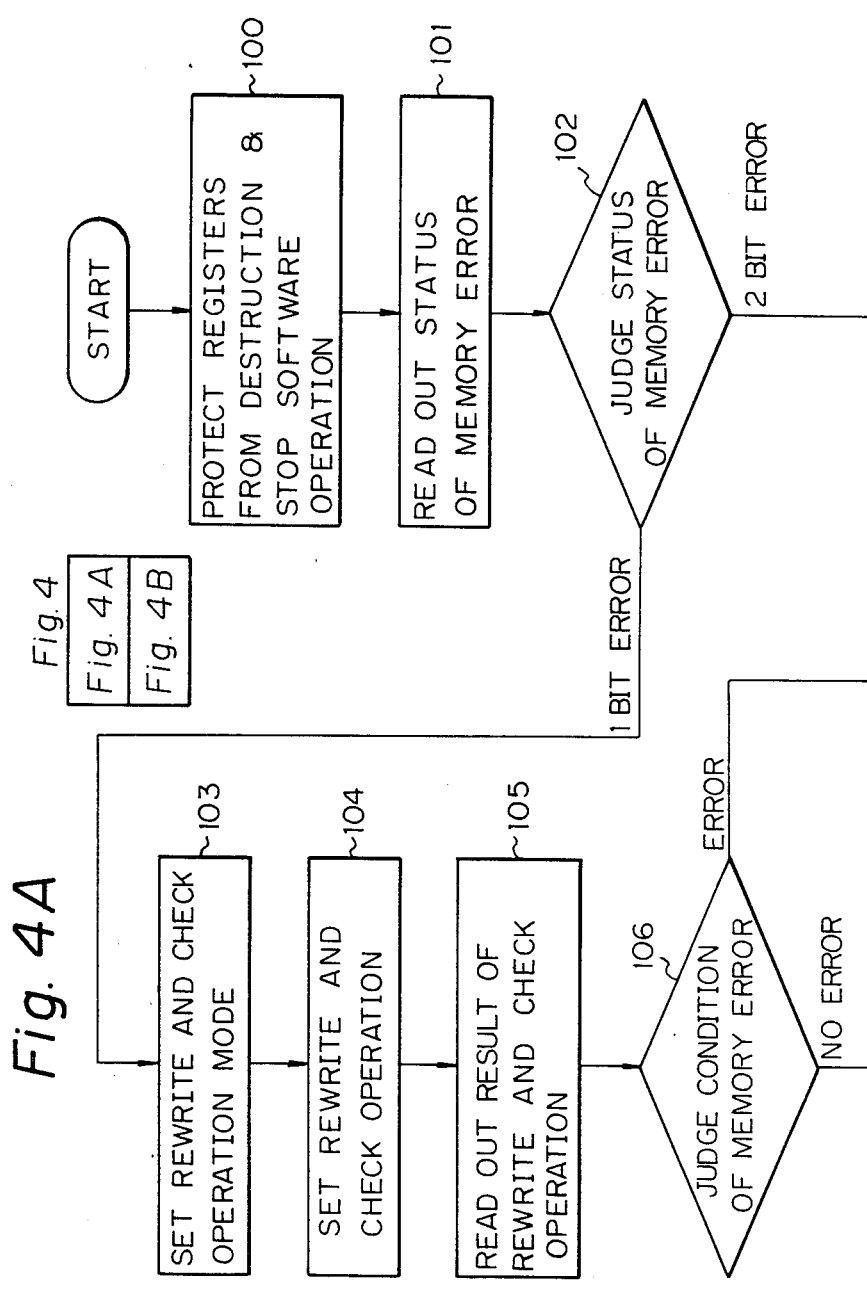

FAULTY-MEMORY PROCESSING METHOD AND APPARATUS

BACKGROUND OF THE INVENTION

1. Field of the Invention

The present invention relates to a method and apparatus for processing a faulty memory, particularly to a method and apparatus for correcting a hard error due to a faulty cell in a dynamic random access memory (RAM).

2. Description of the Prior Art

In general, a memory unit in a data processing system is provided with a function for detecting an error in data read from the memory unit and for correcting the detected error by an error correcting code (ECC). This ECC error detection and correction, however, requires a long time, resulting in a longer memory access time. If the above error detection and correction were executed for all the data read from the memory unit, the processing capability of the data processing system would significantly decrease.

To prevent the above decrease of the processing capability, the read data is first output to a central processing unit (CPU), and the process using the read data is executed before the error detection and correction. This method is useful in cases where a read data error seldom occurs. When an error is detected in the read data, the CPU is stopped in accordance with a memory error signal produced later, the corrected data is written back into the memory, then the read-out operation is rerun.

There are two kinds of errors in data (words) stored in a memory. One is a temporary error, such as a soft error, which can be corrected in the memory by writing back (rewriting) the corrected data. The other is a hard error which cannot be corrected in the memory by rewriting the corrected data. A hard error may occur because of a faulty cell in the memory (e.g., a cell is stuck at "1" or "0"). In the case of a hard error, an error occurs every time that the bad bit is accessed.

There are three prior art methods for coping with hard errors, as follows:

(1) Repairing the faulty cell causing the error when a hard error occurs. This method, however, does not effectively utilize the error detection and correction function.

(2) Executing the above-mentioned ECC error correction every time a hard error occurs. This method, however, lengthens the access time by the time required for each error correction. This in turn slows down the operation of the data processing system, greatly decreasing the processing capability.

(3) Memorizing the memory address of a hard error and carrying out an ECC error correction only when the memorized address is accessed. This method, however, requires a plurality of registers for memorizing the memory address of the hard error and a circuit for detecting coincidence of addresses. Furthermore, according to this method, it is necessary to detect the coincidence of addresses between all addresses input and the addresses in the registers, making the access time longer.

As mentioned above, the prior art systems for dealing with hard errors have disadvantages in that they slow down the operation of the data processing system and thus significantly decrease the processing capability of the data processing system.

SUMMARY OF THE INVENTION

It is, therefore, an object of the present invention to provide a faulty-memory processing method and apparatus having an ECC error detection and correction function, whereby a decrease in the processing capability due to the correction of a hard error can be minimized.

According to the present invention, the above object is achieved by a faulty-memory processing method comprising the steps of: detecting a hard error which may exist in at least one cell in a normal or primary memory, which detection is carried out using an error correction means; correcting, by using the error correction means, an error in information read out from a detected harderror cell of the normal memory; and transcribing information including the corrected information with respect to the detected hard-error cell of the normal memory into a relief memory. The above correcting and transcribing steps are executed during breaks in a time-sharing data process of a data processing system.

The above object is also achieved by a faulty memory processing apparatus comprising: means for detecting a hard error which may exist in at least one cell in a normal memory, which detection is carried out by using an error correction means; means for correcting, by using the error correction means, an error in information read out from a detected hard-error cell of the normal memory; and means for transcribing information including the corrected information with respect to the detected hard-error cell of the normal memory into a relief memory. The above correcting and transcribing are executed during breaks in a time-sharing data process of a data processing system.

Since a part of the memory transcription operation for transcribing data into the relief memory is carried out during breaks of the data process, such as memory refresh periods, the interruptions of the data process due to the memory transcription operation can be minimized. This minimizes the decrease in the processing capability. Since the interruptions of the data process is extremely short, the present invention may be useful for a realtime data processing system. A temporary error in data is corrected by rewriting Since high-speed data processing is executed by first using read data before error detection and correction during normal operation, and slow down of the data process occurs only when an error is detected and corrected, the high speed of the data processing can be maintained. the corrected data, and a hard error in data is corrected by rewriting the corrected data into a relief memory. Therefore, both kinds of error can be corrected, thus improving the reliability of the memory unit. The rewriting operation and switching operation, with respect to the relief memory are executed by means of a microprogram in the CPU and hardware in the memory unit MU. That is, software stored in the memory unit is not used for correcting an error in the memory, thus avoiding complication of the software. As a result, high-speed data processing can be maintained, and tolerance against overload during real-time data processing can be effectively increased.

BRIEF DESCRIPTION OF THE DRAWINGS

FIGS. 2A and 2B, which comprise FIG. 2, are detailed block diagrams of a memory unit in FIG. 1;

FIGS. 4A and 4B, which comprise FIG. 4, are flow diagrams of the operation of a CPU;

DESCRIPTION OF THE PREFERRED EMBODIMENTS

Figure 1:
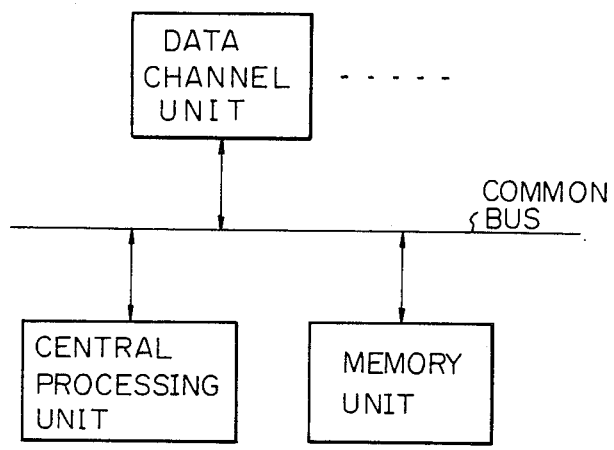
FIG. 1 is a schematic block diagram of a data processing apparatus embodying the present invention.

Referring to FIG. 1, a data processing system fundamentally has a CPU, a memory unit (MU), and data channel units (DCH), connected to each other by a common bus. Input/output (I/O) devices are coupled to the data channel units. The CPU performs data processing in cooperation with the MU. The DCH's control the I/O devices with respect to the MU. The MU includes an error detecting circuit for detecting errors in read and write data with respect to the MU and an error correcting circuit for automatically correcting the detected error.

FIG. 2 illustrates the components of the MU of FIG. 1 in detail. In FIG. 2, reference numeral 1 denotes a write data register for temporarily storing write data from the CPU via the common bus and 2 a write data distribution and selection circuit for selecting one of the write data from the write data register 1 and rewrite data from an inversion and selection circuit 10 and for distributing the write data to a normal memory 3 or to a relief memory 4. The normal memory 3 and the relief memory 4 comprise a memory assembly 16.

Figure 3:
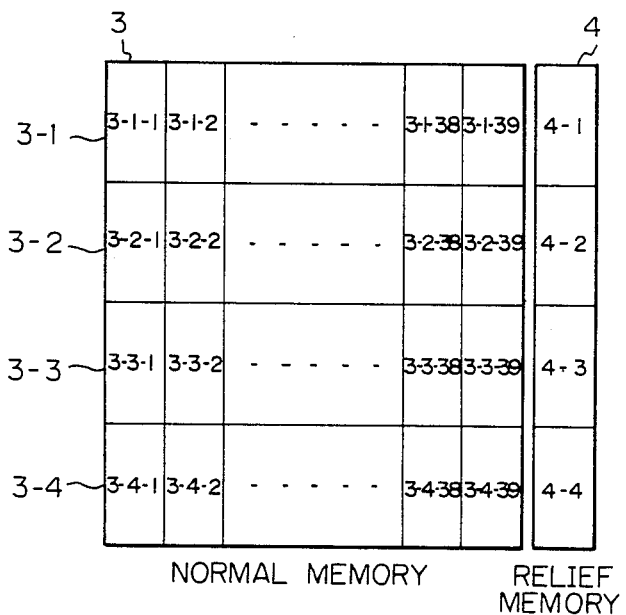
FIG. 3 is a diagram of a memory assembly in FIG. 2.

FIG. 3 illustrates the components of an example of the memory assembly 16. The normal memory 3 is composed of four memory blocks 3-1, 3-2, 3-3, and 3-4. If the MU deals with data in units of 32 bits along with an ECC of 7 bits, thus the normal memory 3 must be constructed to store a word of 39 bits in width. Thus, each of the memory blocks, for example, the memory block 3-1, is divided into 39 sub-blocks, for example 3-1-1, 3-1-2, ---, 3-1-38, and 3-1-39. Each of the sub-blocks is composed of at least one dynamic RAM. As is well-known, because there is a tendency for a charge to be lost over time, it is necessary to periodically read information stored in each cell of the dynamic RAM and to write the information back into each cell so as to restore the charge to its initial value. This operation is called a refresh operation. The MU is provided with a circuit for executing the refresh operation.

When using a dynamic RAM of 256 K bits as a memory element, each of the sub-blocks is composed on $N \times RAM$'s, where N is a natural number. In this case, $N \times 256$ K words of 39 bits can be stored in each of the memory blocks 3-1, 3-2, 3-3, and 3-4. That is, $4 \times N \times 256$ K words of 39 bits can be stored in the normal memory 3.

The relief memory 4 is composed of four memory blocks 4-1, 4-2, 4-3, and 4-4. The memory blocks 4-1, 4-2, 4-3, and 4-4 of the relief memory 4 are used to relieve one of the sub-blocks of the memory blocks 3-1, 3-2, 3-3, and 3-4, respectively. Therefore, each of the memory blocks 4-1, 4-2, 4-3, and 4-4 has the same construction as that of each sub-block in the normal memory 3, namely is composed of $N \times RAM$ of 256 K bits. If a hard error occurs in one of the sub-blocks 3-1-1, ---, 3-4-39 in the normal memory 3, the contents in the faulty sub-block are transcribed or transferred to a corresponding memory block of the relief memory 4. It is clear that the memory elements which constitute the normal memory 3 and the relief memory 4 can be changed from a RAM of 256 K bits to a RAM of 64 K bits.

The MU includes registers 5-1, 5-2, 5-3, and 5-4 for storing the bit position of the hard error, a read data register 6 for temporarily storing read data from the normal memory 3, and a read data register 7 for temporarily storing read data from the relief memory 4. A selection circuit 8 selects one of read data from the read data registers 6 and 7 and feeds the selected read data to an error detecting circuit 9 for detecting errors and for producing ECC and/or to the inversion and selection circuit 10, which functions to correct an error bit by inverting data applied thereto. The MU further includes an address register 11, a refresh address counter 12, a memory control circuit 13, a maintenance register 14, and a row address counter 15. Control lines 17 coupled to the memory control circuit 13 are connected to each portion (each register) in the MU.

Under a normal operation mode, the CPU first receives read data from the MU and executes a process using the received read data before detection and correction of an error in the read data, without waiting for the result of the error detection. When an error is detected in the read data, the process by the CPU is stopped in response to a memory error signal $S_b$, and then corrected data is written back in the memory. Thereafter, the read-out operation from the memory is retried. Thus, the access time can be shortened, and high speed processing can be executed.

Hereinafter, the normal read-out operation of the MU will be described in detail. When a memory control signal $S_1$ instructing a read out of data from the normal memory 3 is fed to the memory control circuit 13 from the CPU via the common bus and a memory address signal $S_3$ is fed to the memory control circuit 13 from the CPU via the common bus and via the address register 11, the contents in a memory address x specified by the above memory address signal $S_3$ are read out out from the normal memory 3 to the read data register 6. The read data is fed to the inversion and selection circuit 10 via the selection circuit 8. The read data is also fed via the selection circuit 8 to the error detecting circuit 9, wherein the read data is checked for error. When an error is detected, error bit position information $S_9$ is fed to the inversion and selection circuit 10 and to error bit position indicating bits 14-4 of the maintenance register 14. Although the inversion and selection circuit 10 functions to correct the error by inverting the error bit in response to the error bit position information $S_9$, under the normal operation mode, the read data from the address x in the normal memory 3 is passed through the inversion and selection circuit 10 and fed first to the CPU via the common bus before receiving the above error bit position information $S_9$. The CPU at once executes a process by using the received read data.

When an error is detected in the read data, an error detection signal $S_a$ produced at the error detecting circuit 9 is fed to the memory control circuit 13. The memory control circuit 13 feeds a memory error signal $S_b$ to the CPU via the common bus in response to the error detection signal $S_a$. This memory error signal $S_b$ from the memory control circuit 13 is fed to the CPU, after the read data $S_5$ from the normal memory 3 is fed to the CPU and the CPU starts an operation using the read data.

Since this embodiment uses an ECC of 7 bits, the error detecting circuit 9 and the inversion and selection circuit 10 can automatically correct an error of 1 bit and detect an error of 2 bits, although it is impossible to correct the 2 bit error. When a 1 bit error is detected, the error detecting circuit 9 produces an error detection signal $S_a$ to change the contents of a 1 bit error indicating bit 14-1-1 of the maintenance register 14 from "0" to "1". When a 2 bit error is detected, the contents of a 2 bit error indicating bit 14-1-2 of the maintenance register 14 is changed from "0" to "1".

Next, the operation of the CPU when it receives the memory error signal $S_b$ is described with reference to FIG. 4. The following operation of the CPU is carried out in accordance with a microprogram stored in the CPU itself, not in accordance with a program stored in the MU.

Figure 4B:
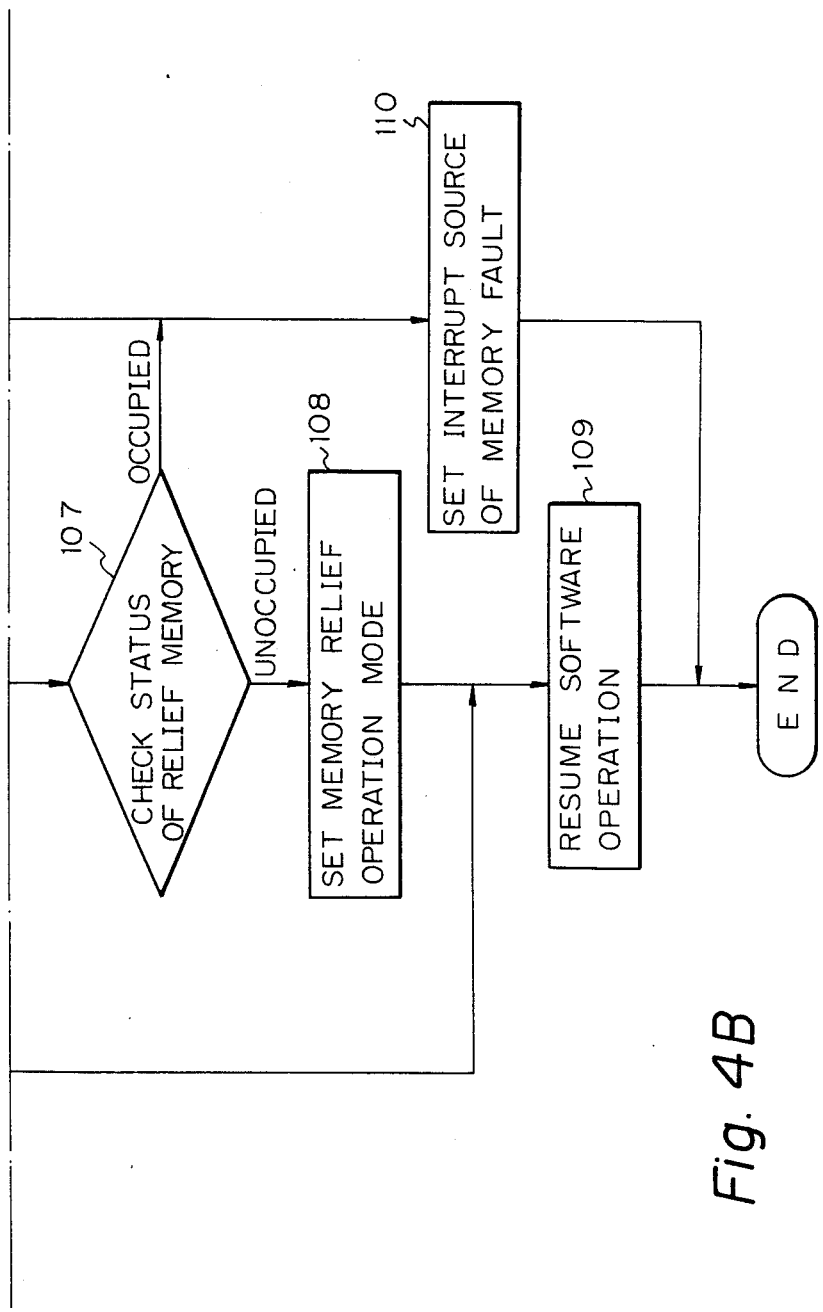

When the CPU receives the memory error signal $S_b$, a microprogram stored in the CPU starts to execute the operation of FIG. 4. In a block 100, the contents in all registers of the CPU are protected from destruction, and the software operation controlled by software stored in the MU is stopped.

In a block 101, the CPU determines the status of the memory error. Namely, the CPU feeds a memory control signal $S_1$ for reading out the contents of the maintenance register 14 to the memory control circuit 13. The memory control circuit 13 reads out the contents in the maintenance register 14 in response to the signal $S_1$ and feeds the read contents as read data signals $S_5$ to the CPU through the inversion and selection circuit 10.

In block 102, the status of the memory error is determined. That is, it is judged whether the memory error is 1 bit error or 2 bit error in accordance with the contents in the 1 bit error indicating bit 14-1-1 and in the 2 bit error indicating bit 14-1-2 of the maitnenance register 14.

If it is 1 bit error, namely if the content of the 1 bit error indicating bit 14-1-1 is "1", the operation in block 103 is carried out. In block 103, the CPU outputs an instruction for setting a write back (rewrite) and check operation mode. This setting is carried out by feeding a control signal $S_1$ to the memory control circuit 13 and by outputting a certain instruction data with the address data $S_3$ so as to set a rewrite and check operation mode indicating bit 14-5 in the maintenance register 14 to "1". Then, in block 104, the CPU outputs an instruction for starting a rewrite and check operation. That is, the CPU instructs the MU to read out again the contents in the memory address x where the memory error was detected. The MU executes the rewrite and check operation in response to the above instruction for starting the rewrite and check operation. This execution of the MU is described later in detail with reference to FIG. 5.

In block 105, the CPU determines the result of the rewrite and check operation executed by the MU. The MU performs the rewrite and check operation and thereafter feeds a memory response signal $S_2$ to the CPU. The CPU then outputs a memory control signal $S_1$ for reading out contents in the maintenance register 14 to the memory control circuit 13. As a result, the memory control circuit 13 reads out the contents in the maintenance register 14 and feeds the read contents to the CPU through the inversion and selection circuit 10 as read data signals $S_5$.

Then, in block 106, the status of the memory error is determined. That is, it is judged whether there is an error in the read data by checking the content in the 1 bit error indicating bit 14-1-1 of the maintenance register 14. If the content thereof is "1", it is determined that this error cannot be corrected by the operation in the blocks 103 to 105. Thus, the memory error is treated as a hard error due to a permanent fault in a memory cell. Then, the operation in blocks 107 for relieving the faulty bit with the relief memory 4 is carried out. In block 107, the CPU checks on whether the memory block of the relief memory 4 corresponding to the memory block of the normal memory 3, in which the error address x is included, is occupied or unoccupied. This check is performed by checking contents in the relief memory status indicating bits 14-2-1 to 14-2-4 of the maintenance register 14. If the memory blocks 4-1 to 4-4 are unoccupied, the contents in the relief memory status indicating bits 14-2-1 to 14-2-4 are set to "1", respectively, and vice versa.

When the relief memory block corresponding to the normal memory block including the error address x is unoccupied, the operation in block 108 is carried out. In block 108, the CPU outputs an instruction for setting the memory relief operation mode in the MU. This setting is carried out by outputting a control signal $S_1$ to the memory control circuit 13 and by outputting certain instruction data with the address data $S_3$ to the MU. Thus, the error bit position information $S_9$ which has been stored in the error bit position indicating bit 14-4 of the maintenance register 14 is written into the register (one of the registers 5-1 to 5-4) corresponding to the normal memory block including the error address x. Furthermore, the corresponding position of the relief memory condition indicating bits 14-2-1 to 14-2-4 and the corresponding position of the memory relief operation mode indicating bits 14-3-1 to 14-3-4 are set to "1".

When the instruction for setting the memory relief operation mode occurs, the MU executes a transcription operation from the normal memory 3 to the relief memory 4. This operation is described in detail later.

After the transcription to the relief memory 3, the CPU resumes the software operation from the error address x (block 109). This software operation is carried out in accordance with the software stored in the MU.

If it is determined in block 107 that the relief memory block corresponding to the normal memory block including the error address x is already occupied, since the corresponding block of the relief memory 4 cannot be used in place of the faulty bit in the normal memory 3, the program proceeds to block 110 where an interrupt source of the memory fault is stored, whereupon the operation is completed. Furthermore, if it is judged in block 102 that the memory error is a 2 bit error, since the error correction cannot save it, the program also proceeds to the block 110 and an interrupt source of the memory fault is stored.

In block 106, if the contents in the 1 bit error indicating bit 14-1-1 of the maintenance register 14 is "0", it is determined that the error is corrected. Thus the program proceeds to block 109 to resume the interrupted software operation.

Figure 5:
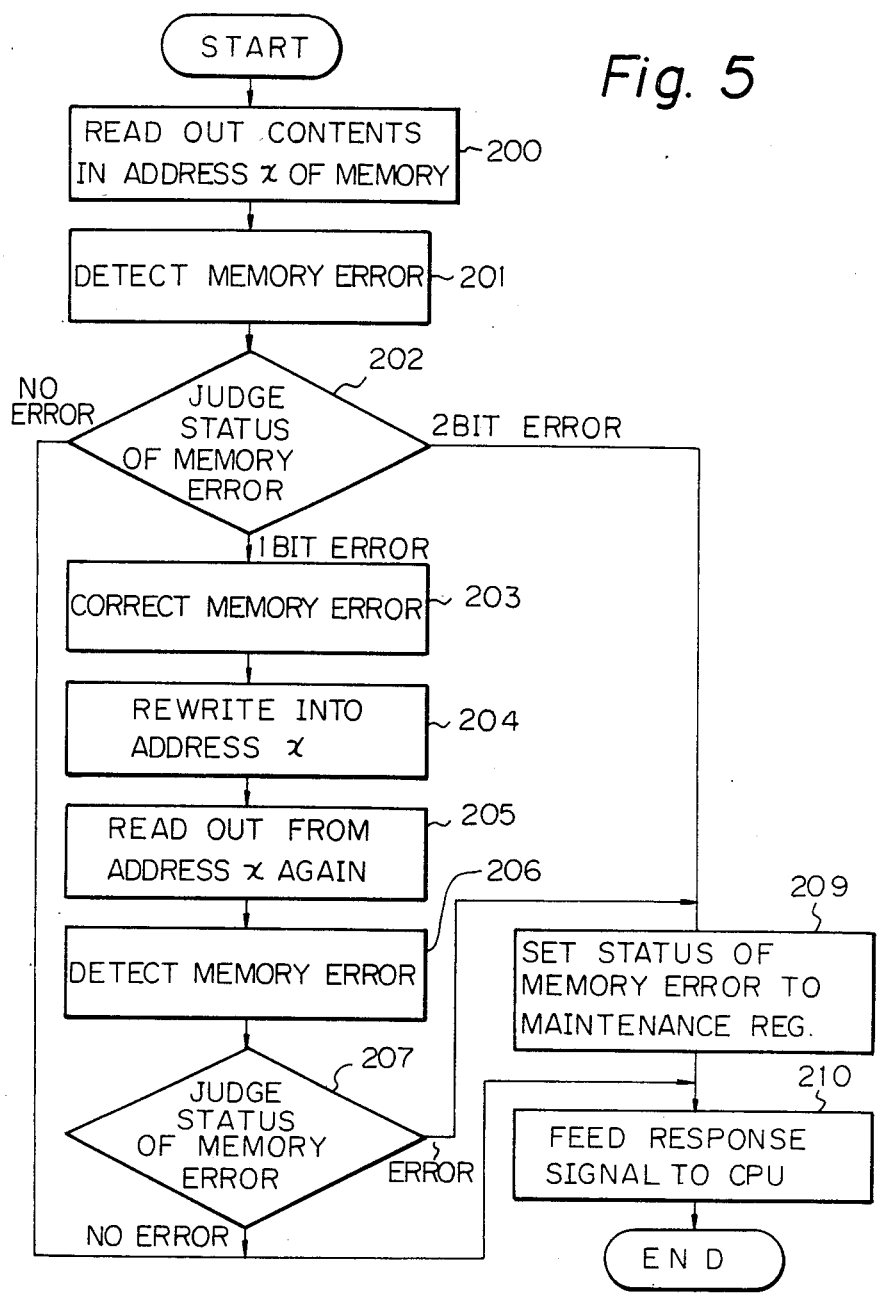
FIG. 5 is a flow diagram of the operation of a memory unit.

FIG. 5 indicates the rewrite and check operation executed by the MU. When the rewrite and check operation mode indicating bit 14-5 of the maintenance register 14 is set to "1" and also the instruction for starting the rewrite and check operation is output by the CPU, the MU starts this rewrite and check operation in FIG. 5.

In block 200, the contents in the error address x of the normal memory 3 are read out again in accordance with the memory address signal $S_3$ which is fed from the CPU with the memory control signal $S_1$ instructing the read out of data from the normal memory 3. The read data is temporarily stored in the read data register 6 and then applied to the inversion and selection circuit 10 and to the error detecting circuit 9 through the selection circuit 8.

In block 201, the read data is checked for errors by the error detecting circuit 9.

In block 202, the status of the memory error is determined in response to the error detection signal $S_a$. If a 1 bit error is detected, the program proceeds to 203 where the error bit is corrected. That is, in response to the error bit position information $S_9$ from the error detecting circuit 9, the inversion and selection circuit 10 inverts the error bit in the read data which is fed thereto through the selection circuit 8.

The corrected read data is, in block 204, fed from the inversion and selection circuit 10 to the normal memory 3 through the distribution and selection circuit 2 and then rewritten in the address x of the normal memory 3.

In block 205, the rewritten data in the address x of the normal memory 3 is read out again and applied to the error detecting circuit 9.

In block 206, an error in the read data is checked for by the error detecting circuit 9.

Then, in block 207, the status of the memory error is judged in response to the error detecting signal $S_a$ from the error detecting circuit 9. If the memory error detected at the point 202 is a temporary error, since the error is corrected by the inversion and selection circuit 10 using the ECC, no error will be detected in block 207. Namely the temporary error has been corrected by the rewrite operation. In that case, the program proceeds to block 210 where the memory control circuit 13 feeds a memory response signal $S_2$ to the CPU. Thus, the MU ends the rewrite and check operation.

During the above rewrite and check operation, the read data from the normal memory 3 is not sent to the CPU. The above memory response signal $S_2$ is sent after the complete end of the rewrite and check operation. After receiving the memory response signal $S_2$, the CPU executes the operation in block 105 of FIG. 4.

If the memory error detected in block 202 is a hard error due to a faulty cell, error will be detected in block 207. Thus, the program proceeds to block 209 where the status of the memory error is set in to the maintenance register 14. In this case, because of the 1 bit error, the 1 bit error indicating bit 14-1-1 of the maintenance register 14 is set to "1" by means of the error detection signal $S_a$ from the error detecting circuit 9.

In block 202, if it is determined that the memory error is a 2 bit error, since it is impossible to correct such an error, the program proceeds to block 209 wherein the 2 bit error indicating bit 14-1-2 of the maintenance register 14 is set to "1" by the error detection signal $S_a$ from the error detecting circuit 9.

If it is judged in block 202 that there is no error, the program directly jumps to block 210 where a memory response signal $S_2$ is output to the CPU.

Next, the memory relief operation of the MU is described in detail. For the relief memory operation, the MU is provided with a relief memory 4 having the four memory blocks 4-1 to 4-4 as mentioned before. If a hard error occurs in one of the sub-blocks 3-1-1 to 3-4-39 in the normal memory 3, the one of four memory blocks 4-1 to 4-4 which corresponds to the normal memory block including the faulty sub-block is used to relieve the faulty sub-block. The MU is further provided with the registers 5-1 to 5-4 for storing the bit position (sub-block position) of a hard error, which registers 5-1 to 5-4 correspond to the memory blocks 3-1 to 3-4, respectively. In the maintenance register 14, the relief memory condition indicating bits 14-2-1 to 14-2-4 and the memory relief operation mode indicating bits 14-3-1 to 14-3-4 are provided as mentioned before.

Figure 6:
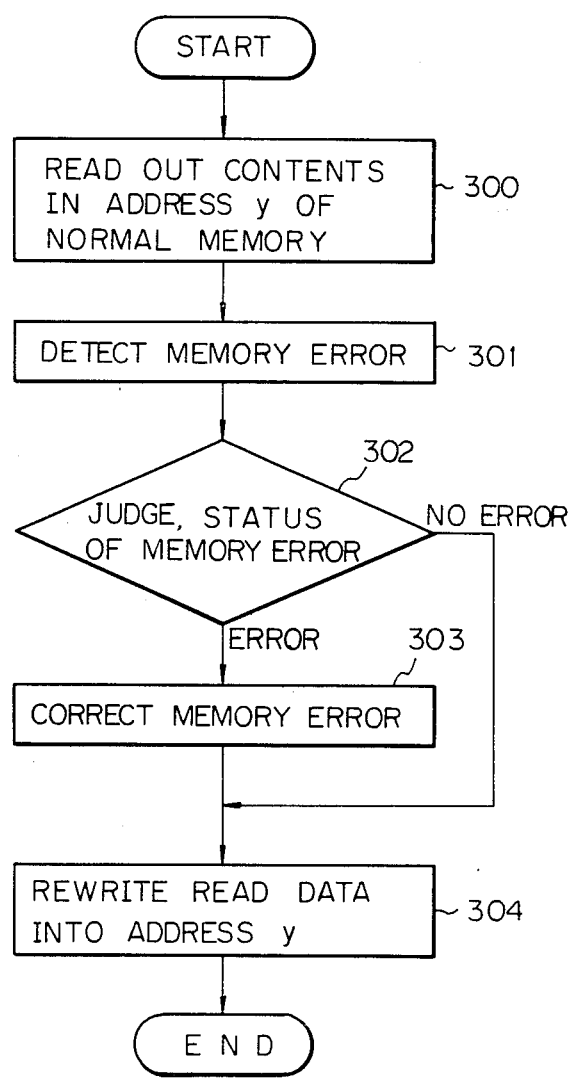
FIG. 6 is a flow diagram of the operation of the memory unit.

When the instruction for setting the memory relief operation mode is produced from the CPU in block 108 of FIG. 4 and a refresh timing signal $S_f$ is produced from the memory control circuit 13, the transcription operation shown in FIG. 6 is started.

In the following explanation, we assume that the error address x at which the memory error was detected is in the memory block 3-2 of the normal memory 3 and each memory block is composed of 256 K words (N=1).

In block 300 of FIG. 6, the content in a memory relief address y in the memory block 3-2 are read out to the read data register 6 and then fed to the error detecting circuit 9 and to the inversion and selection circuit 10 through the selection circuit 8.

In block 301, the read data is checked for error by the error detecting circuit 9. Then, at a point 302, the status of the memory error is determined in response to the error detection signal $S_a$ from the error detecting circuit 9.

If there is a 1 bit error, the program proceeds to block 303 where the error bit is corrected by inverting it at the inversion and selection circuit 10, depending upon the error bit position information $S_9$ from the error detecting circuit 9. Then, the program proceeds to block 304. If there is no error, the program directly proceeds from block 302 to block 304.

In block 304, the read data or corrected read data is rewritten into the memory relief address y of both the normal memory block 3-2 and the relief memory block 4-2. Assuming the sub-block 3-2-l (l is one of 1 to 39) includes a faulty cell; the read data or corrected read data of the bit position of l is rewritten into the memory relief address y of both the sub-block 3-2-l and the relief memory block 4-2. Other read data of bit positions different from l is rewritten into the memory relief address y of the respective sub-blocks of the normal memory block 3-2. The above distribution of the rewrite data is executed by the distribution and selection circuit 2 in response to the contents l in the register 5-2. A similar transcription or transfer operation is carried out in sequence from the first word (first memory address) to 256 K word (memory address of 256 K) of the memory block 3-2 in response to the refresh timing signal $S_f$. After all words of the memory block 3-2 are transcribed, the transcription operation mode ends.

Since the relief memory block 4-2 relieves the sub-block 3-2-l including the faulty cell, all the data of all memory addresses (1 to 256 K) in the sub-block 3-2-l is transcribed into the relief memory block 4-2 after correcting the error data from the faulty cell.

It should be noted that the above-mentioned one-word transcription operation of FIG. 6 is executed every time the refresh timing signal $S_f$ is produced. Namely, the memory refresh period, which is a dead period of time for accessing the MU from the CPU, is used for executing the transcription operation.

Figure 7:
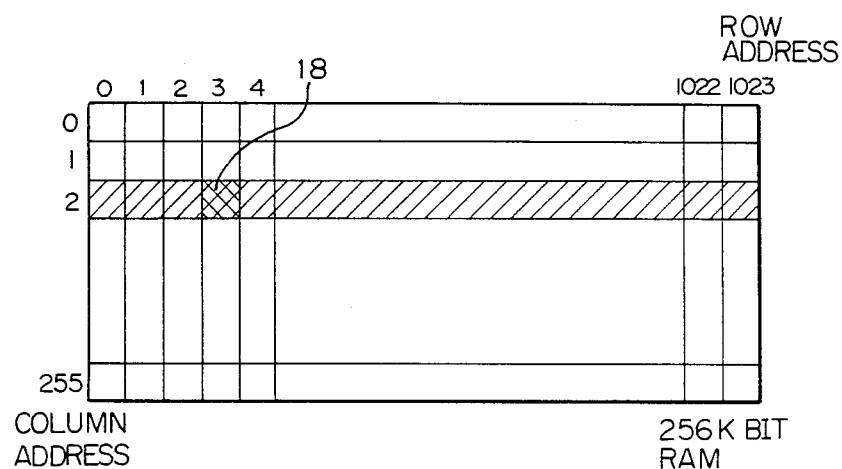
FIG. 7 is a diagram of a memory element.

In each memory element of a dynamic RAM, the refresh operation is periodically executed in response to the refresh timing signal $S_f$. FIG. 7 indicates a memory cell array of a dynamic RAM of 256 K bit. In this RAM, all cells (1024 bits) in a column are simultaneously refreshed at an interval of 15 msec. All cells in the RAM (256 columns) will be refreshed in about 4 msec. As is known, in FIG. 7, if a refresh address (column address) of "2" and a row address of "3" are applied to the RAM, the contents in a cell 18 are read out.

Figure 8:
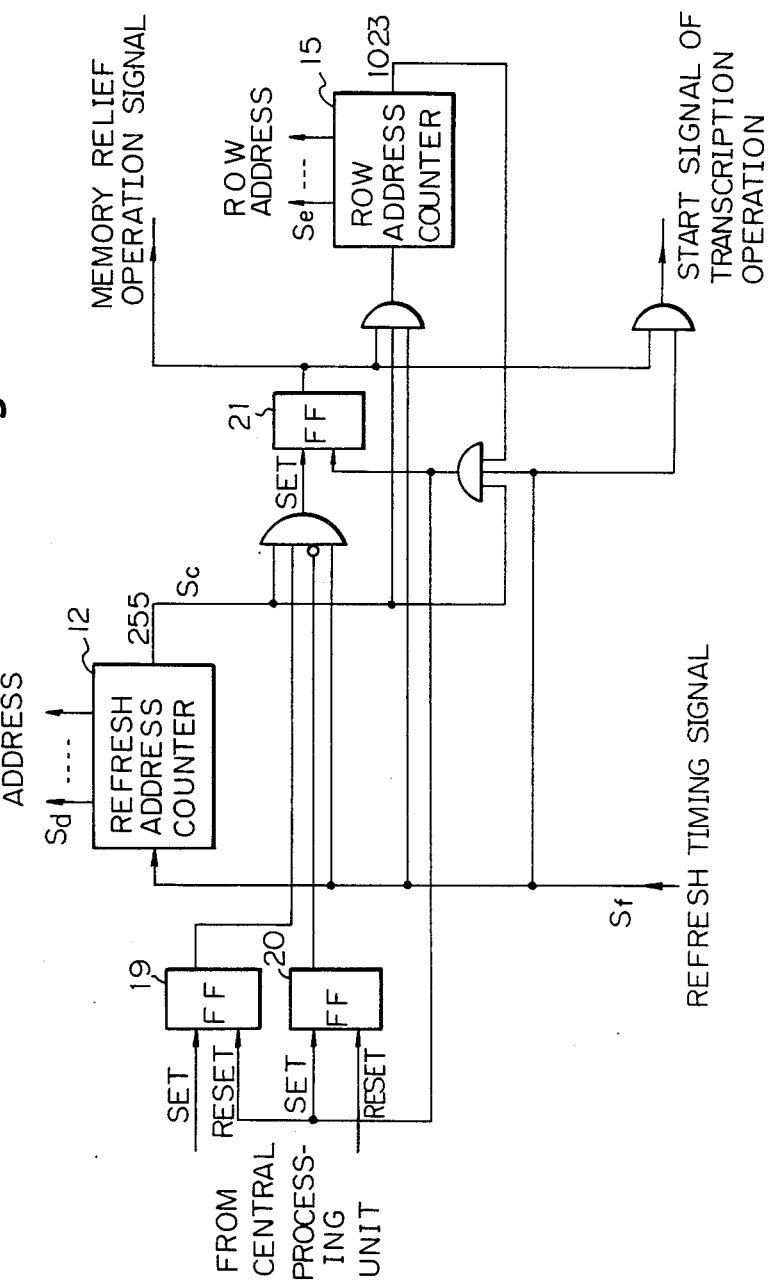
FIG. 8 is a detailed block diagram of a circuit for producing a memory relief address and a start signal of a transcription operation.

FIG. 8 illustrates a circuit for forming memory relief address y and a start signal of the transcription operation. The memory relief address y is composed of the refresh address (column address) $S_d$, produced by the refresh address counter 12 having 8 bits and the row address $S_e$, produced by the row address counter 15 having 10 bits.

A flip-flop 19 for indicating the memory relief operation mode is set by the instruction for setting the memory relief operation mode fed from the CPU. During this mode, therefore, the flip-flop 19 outputs a signal of "1". A flip-flop 20 is used for indicating whether the relief memory condition it is occupied or unoccupied. When unoccupied, a signal of "0" is output from the flip-flop 20.

The refresh timing signal $S_f$, which is produced at an interval of 15 μsec, is applied to the refresh address counter 12 to count up this counter 12. When the refresh address counter 12 is counted up to "255", namely when the column address becomes "255", an overflow signal $S_c$ is produced. When a first one of the refresh start signals $S_f$ is input after the overflow signal $S_c$ is first produced, a flip-flop 21 is set causing a signal (memory relief operation signal) of "1" to be output. This output signal of "1" from the flip-flop 21 in fact indicates that it is in the memory relief operation. Therefore, during this memory relief operation, when the refresh timing signal $S_f$ is produced, the start signal for starting the transcription operation (operation of FIG. 6) is produced. Furthermore, during this memory relief operation, when both the overflow signal $S_c$ and the refresh timing signal $S_f$ are produced, the row address counter 15 is counted up. The memory relief operation signal is also used for switching the distribution and selection circuit 2 so as to select the data from the inversion and selection circuit 10 instead of the write data from the write data register 1.

When the row address counter 15 counts up to "1023" and the refresh address counter counts up to "255", the transcription operation is completed for all the words of 256 K in the memory block 3-2 (in case each sub-memory and relief memory block is composed of a dynamic RAM of 256 K bits). After the completion of the transcription operation, when the first one of the refresh timing signals $S_f$ is produced, the flip-flop 19 and 20 are reset and the flip-flop 20 is set. Simultaneously, the contents in the memory relief operation indicating bit 14-3-2 of the maintenance register 14 (FIG. 2) is cleared.

According to the above-mentioned memory relief operation, the content in the sub-block 3-2-1, having a faulty cell, of the normal memory block 3-2, is written in the relief memory block 4-2. The information 1 indicating the bit position (sub-block position) of the faulty cell has been stored in the register 5-2.

Even during the memory relief operation with respect to the memory block 3-2, the remaining memory blocks 3-1, 3-3 and 3-4 are of course refreshed.

As mentioned before, during the memory refresh period, the MU is not allowed to be accessed from the CPU and the DCH, etc. Namely, the memory refresh period is a dead period of time which cannot be used for a software operation. According to the present invention, since this memory refresh period is utilized for a part of the memory relief operation, the CPU and the DCH are not employed for so long a time for the memory relief operation. Thus, the processing capability thereof can be prevented from being greatly decreased. Furthermore, since the memory relief operation is carried out during the memory refresh period, a refresh address counter which has been already provided can be used for the relief operation. This enables reduction of the manufacturing cost of the system.

When the memory relief operation is over, the content in the relief memory condition indicating bit 14-2-2 corresponding to the memory block 3-2 is set to "1", which means occupied, and the contents in the memory relief operation mode indicating bit 14-3-2 is reset to "0", which means it is not in the memory relief operation mode.

After the memory relief operation, the MU resumes the normal operation mode wherein read out data is fed to the CPU or to the DCH before checking read data error by the error detection circuit 9 in response to a data read instruction. Therefore, a short access time and high processing speed can be maintained.

The sub-block 3-2-1 having the permanent fault is not accessed after the memory relief operation. Instead of the sub-block 3-2-1, the relief memory block 4-2 is accessed. This switching is executed by the distribution and selection circuit 2 in response to the content in the register 5-2.

It should be noted that, during the memory relief operation mode, if the MU is accessed from the CPU, etc., since all the data in the sub-block 3-2-1 is not transcribed in the relief memory block 4-2 at this time, the content in the normal memory 3 including the sub-block 3-2-1 is read out and corrected read data is output. After the memory relief operation mode, the sub-block 3-2-1 is not used.

Many widely different embodiments of the present invention may be constructed without departing from the spirit and scope of the present invention. It should be understood that the present invention is not limited to the specific embodiments described in this specification, except as defined in the appended claims.

The number of memory blocks of the normal and relief memories 3 and 4 can be freely determined. The storage capacities of the memory element (RAM) and the memory block are not limited to 256 K bits and 256 K words.

The word used in the MU is not limited to 39 bits (data of 32 bits and ECC of 7 bits).

The error detection capability is not limited to 2 bit detection and the error correction capability is not limited to 1 bit correction. In order to be able to correct n bits (n>1), it is necessary to provide n registers for storing error bit positions of the hard error for each memory block and to modify the error detection circuit 9, distribution and selection circuit 2, selection circuit 8, and inversion and selection circuit 10, accordingly.

The memory relief operations of a plurality of memory blocks may be simultaneously executed. In order to do this, it is necessary to provide a row address counter 15 for each memory block.

A part of the software operation of the CPU (operation from block 100 to block 103 of FIG. 4) may be partly or wholly executed by the MU.

The present invention is not limited to an MU and CPU executing a stored program (software) and may also be used for memory device operated by a hardware.

Although departing from the spirit and scope of the present invention, in some systems, particularly in some real-time processing system, data processing may be completely stopped during the memory relief operation, which lasts for over 100 msec.

I claim:

1. A faulty memory processing method in a data processing system including memory means having a normal memory with a plurality of cells for storing information, a relief memory, and error correction means for detecting and correcting an error in information read out from at least one cell in said normal memory, said data processing system executing a time-sharing data process with time period breaks, said faulty-memory processing method comprising the steps of:
   detecting a hard error which may exist in at least one cell in said normal memory, said detection being carried out using said error correction means;
   correcting, using said error correction means, an error in information read out from a detected hard-error cell of the normal memory;
   transcribing information including the corrected information with respect to the detected hard-error cell of the normal memory into the relief memory, said correcting and transcribing steps being executed during the time period breaks in said time-sharing data process; and
   processing in a normal mode where data read out from the memory means are immediately utilized without waiting for the detection and correction performed by the error 2. A method as claimed in claim 1, wherein said detecting step includes the steps of:
   correcting an error in information read out from at least one cell in the normal memory by said error correction means;
   writing the corrected information back in said cell in which the error occurs;
   reading out information again from said error cell in the normal memory; and
   detecting an error, by said error correction means, in the information read out again from said error cell.

3. A method as claimed in claim 1, wherein said memory means further includes refresh means for periodically refreshing a plurality of cells in the normal and relief memories for a predetermined period of time, said correcting and transcribing steps being executed during said refresh period.

4. A method as claimed in claim 3, wherein said correcting step is started at the start of every refresh period.

5. A method as claimed in claim 1, further comprising stopping the data processing when an error is detected in the information presently used in the data processing and awaiting detection of a hard error.

6. A method as claimed in claim 1, wherein said memory means stores a program for controlling data processing of the data processing means, wherein said correcting and transcribing steps are executed without using said program.

7. A faulty-memory processing apparatus in a data processing system including memory means having a normal memory with a plurality of cells for storing information, a relief memory, and error correction means for detecting and correcting an error in information read out from at least one cell in said normal memory, said data processing system executing a time-sharing data process with time period breaks, indicating the time period breaks and executing an operation using data read out of said memory means during a data error detection and correction operation, said faulty-memory processing apparatus comprising;
   means for detecting a hard error which may exist in at least one cell in said normal memory, said detection being carried out by using said error correction means during the data operation by said data processing system;
   means for correcting, by using said error correction means, an error in information read out from a detected hard-error cell of the normal memory and detecting the time period breaks; and
   means for transcribing information including the corrected information with respect to the detected hard-error cell of the normal memory into the relief memory, said correcting and transcribing being executed during the time period breaks in said time-sharing data process.

8. An apparatus as claimed in claim 7, wherein said detecting means includes:
   means for correcting an error in information read out from at least one cell in the normal memory by using said error correction means;
   means for writing the corrected information back in said cell from which the error occurs;
   means for reading out information again from said error cell in the normal memory; and
   means for detecting, by using said error correction means, an error in the information read out again from said error cell.

9. An apparatus as claimed in claim 7, wherein said memory means further includes refresh means for periodically refreshing a plurality of cells in the normal and relief memories for a predetermined period of time, said correcting and transcribing being executed during said refresh period.

10. An apparatus as claimed in claim 9, wherein said correcting is started at the start of every refresh period.

11. An apparatus as claimed in claim 7, wherein said data processing system first executes data processing using information read out from the normal memory of the memory means without waiting for detection of an error which may occur in said information presently used in the data processing.

12. An apparatus as claimed in claim 11, wherein said data processing system stops the data processing when an error is detected in the information presently used in the data process and awaits detection of a hard error.

13. An apparatus as claimed in claim 7, wherein said memory means stores a program for controlling data processing by the data processing system, and wherein said correcting and transcribing are executed without using said program.

14. A memory apparatus for a processor which executes using read-out data during a data error detection and correction operation, the memory apparatus and processor operatively connected to a bus and comprising:
- memory control means, operatively connected to the bus, for controlling memory refresh and memory transcription and for stopping execution by the processor when an error is detected;
- an address register operatively connected to the bus;
- a write data register, operatively connected to the bus, for receiving and storing write data;
- distribution and selection means, operatively connected to the write data register, for selecting the write data;
- a normal memory operatively connected to said distribution and selection means;
- a relief memory operatively connected to said distribution and selection means, said distribution and selection means selecting and applying data to said normal memory or said relief memory, and said relief memory for storing corrected data when a hard error occurs in said normal memory;
- a first read data register operatively connected to said normal memory;
- a second read data register operatively connected to said relief memory;
- selection means, operatively connected to said first and second read data registers, for selecting the data from one of said first and second read data registers;
- error detecting means, operatively connected to said memory control means and said selection means, for detecting errors in the data from said selection means while the processor is executing using the data;
- error correction means, operatively connected to said memory control means, said selection means, said error detecting means, said distribution and selection means and the bus, for transferring the data from said selection means to the processor via the bus without correction and for transferring the data from said selection means to said distribution and selection means after correction, said distribution and selection means storing the corrected data in said normal memory;
- status storage means, operatively connected to said error detecting means, said address register and said memory control means, for storing a type of error detected and a status indicator indicating which of the relief memory or normal memory stores the correct data; and
- said memory control means controlling the reading out of the corrected data and if the corrected data contains an error, said memory and control means transferring newly corrected data to said relief memory and indicating that said relief memory stores the correct data.

15. A data correction method for data transferred to a processor using primary and relief memories, comprising the steps of:
- beginning execution using data read from the primary memory;
- detecting an error in the data read from the primary memory and stopping execution;
- correcting the error and storing corrected data in the primary memory;
- detecting an error in the corrected data;
- correcting the error in the corrected data and storing newly corrected data in the relief memory;
- indicating that the relief memory stores correct data; and
- transferring the newly corrected data to the processor and resuming execution.

* * * * *

UNITED STATES PATENT AND TRADEMARK OFFICE
CERTIFICATE OF CORRECTION

PATENT NO. : 4,617,660
DATED : October 14, 1986
INVENTOR(S) : Yasuhiko Sakamoto

It is certified that error appears in the above-identified patent and that said Letters Patent is hereby corrected as shown below:

Col. 2, line 48, delete "A temporary error in";
line 49, delete line in its entirety;
line 55, "the" should be --A temporary error in data is corrected by rewriting the--.

Col. 3, line 60, "on" should be --of--.

Col. 4, line 50, delete "out" (second occurrence).

Col. 6, line 16, "blocks" should be --block--.

Col. 9, line 31, delete "it".

Col. 11, line 14, delete "a";
line 46, after "error" insert --correction means.--.

Signed and Sealed this

Twenty-fourth Day of February, 1987

Attest:

DONALD J. QUIGG

*Attesting Officer*     *Commissioner of Patents and Trademarks*